(12) United States Patent
Gollapudi et al.

(10) Patent No.: US 8,250,092 B2
(45) Date of Patent: *Aug. 21, 2012

(54) SEARCH RESULT DIVERSIFICATION

(75) Inventors: Sreenivas Gollapudi, Cupertino, CA (US); Rakesh Agrawal, San Jose, CA (US); Samuel Ieong, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/329,574

(22) Filed: Dec. 19, 2011

(65) Prior Publication Data

US 2012/0089588 A1 Apr. 12, 2012

Related U.S. Application Data

(63) Continuation of application No. 12/334,257, filed on Dec. 12, 2008, now Pat. No. 8,086,631.

(51) Int. Cl.
*G06F 17/30* (2006.01)
*G06F 17/00* (2006.01)

(52) U.S. Cl. .................. 707/771; 707/710; 707/731

(58) Field of Classification Search .................. None
See application file for complete search history.

(56) References Cited

U.S. PATENT DOCUMENTS

| | | | | |
|---|---|---|---|---|
| 5,999,902 A * | 12/1999 | Scahill et al. | ............ | 704/240 |
| 6,389,436 B1 * | 5/2002 | Chakrabarti et al. | ......... | 715/229 |
| 7,089,226 B1 * | 8/2006 | Dumais et al. | ............ | 707/740 |
| 7,593,904 B1 * | 9/2009 | Kirshenbaum et al. | ......... | 706/12 |
| 7,720,848 B2 * | 5/2010 | Guerraz et al. | ............ | 707/737 |
| 7,765,178 B1 * | 7/2010 | Roizen et al. | ............ | 1/1 |
| 7,774,360 B2 * | 8/2010 | Sun et al. | ............ | 707/776 |
| 7,801,896 B2 * | 9/2010 | Szabo | ............ | 707/739 |
| 7,882,127 B2 * | 2/2011 | Venkayala et al. | ............ | 707/776 |
| 7,890,514 B1 * | 2/2011 | Mohan et al. | ............ | 707/748 |
| 7,984,035 B2 * | 7/2011 | Levin et al. | ............ | 707/706 |
| 8,019,744 B1 * | 9/2011 | Roizen et al. | ............ | 707/706 |
| 8,051,084 B2 * | 11/2011 | Tunkelang et al. | ............ | 707/737 |
| 8,099,429 B2 * | 1/2012 | Deyo et al. | ............ | 707/776 |
| 2002/0107853 A1 * | 8/2002 | Hofmann et al. | ............ | 707/7 |
| 2004/0260677 A1 * | 12/2004 | Malpani et al. | ............ | 707/3 |
| 2005/0022106 A1 * | 1/2005 | Kawai et al. | ............ | 715/500 |
| 2006/0155694 A1 * | 7/2006 | Chowdhury et al. | ............ | 707/4 |
| 2007/0208772 A1 * | 9/2007 | Harik et al. | ............ | 707/102 |
| 2011/0078130 A1 * | 3/2011 | Roizen et al. | ............ | 707/706 |

OTHER PUBLICATIONS

Li Zhang, ShiXia Liu, Yue Pan, LiPing Yang "InfoAnalyzer: A ComputerAided Tool for Building Enterprise Taxonomies" Nov. 2004, IBM China Research Laboratory, ACM.*

Scott Spangler, Jeffrey T. Kreulen, Justin Lessler "MindMap: Utilizing Multiple Taxonomies and Visualization to Understand a Document Collection" 2002, Proceedings of the 35th Hawaii International Conference on System Sciences, IEEE source.*

\* cited by examiner

*Primary Examiner* — Neveen Abel Jalil
*Assistant Examiner* — Polina Peach
(74) *Attorney, Agent, or Firm* — Shook, Hardy & Bacon L.L.P.

(57) ABSTRACT

Methods, apparatus, and systems directed to receiving search queries, retrieving documents, computing the number of categories to present for a given query, computing the number of results to show in each category, computing an ordering of categories, and for all the result pages beyond the first page employing user interface elements that optionally allow the user to quickly zoom in on a specific category and get more results belonging to that category.

12 Claims, 8 Drawing Sheets

| INPUT | |
|---|---|
| CATEGORY A PROB = 0.8 | CATEGORY B PROB = 0.2 |
| (DOC A1, 0.7) | (DOC B1, 0.8) |
| (DOC A2, 0.6) | (DOC B2, 0.5) |
| (DOC A3, 0.4) | (DOC B3, 0.2) |
| (DOC A4, 0.3) | ⋮ |
| ⋮ | |

OUTPUT UNDER DIFFERENT APPROACHES

| PROPORTIONAL | AUTHORITY | DIVERSIFICATION |
|---|---|---|
| (DOC A1, 0.7) | (DOC B1, 0.8) | (DOC A1, 0.7) |
| (DOC A2, 0.6) | (DOC A1, 0.7) | (DOC B1, 0.8) |
| (DOC A3, 0.4) | (DOC A2, 0.6) | (DOC A2, 0.6) |
| (DOC A4, 0.3) | (DOC B2, 0.5) | (DOC A3, 0.4) |
| (DOC B1, 0.8) | (DOC A3, 0.4) | (DOC B2, 0.5) |
| ⋮ | ⋮ | ⋮ |

SEARCH RESULT DIVERSIFICATION

CROSS-REFERENCE TO RELATED APPLICATIONS

This application is a continuation of U.S. patent application Ser. No. 12/334,257, filed Dec. 12, 2008, which is herein incorporated by reference in its entirety.

TECHNICAL FIELD

This invention relates in general to computing, and in particular, to search engines used in general computing environments. More specifically, but without restriction to the particular embodiments hereinafter described in accordance with the best mode of practice, this invention relates to methods and apparatus for obtaining result diversification when using a search engine in a computing environment to obtain a listing of results upon execution of a search query.

BACKGROUND

Today's search engines follow a decade old paradigm in presenting search results to a user. In response to a user query, typically expressed in the form of a few keywords and often times just one or two words, current search engines use a proprietary ranking algorithm to return documents deemed most relevant to the query. The factors that go into the computation of the relevance of a page include the authoritativeness of other pages on the web pointing to the page under consideration and the number of people accessing the page (via clicks) to name a few.

A key problem in the above paradigm is that the meaning of keywords used for expressing a query is often ambiguous. It is thus difficult for the search engine to correctly 'guess' user intent and return results that satisfy the actual intent of the specific user asking the query. For example, given the query flash, different users may be looking for very different information when they ask this query. A first user may be looking for the Adobe Flash player, while a second might may be interested in information about Flash Gordon, the adventure hero, and a third user may be interested in the location Flash, which happens to be the village with the highest elevation in England. In general, a very large number of queries, particularly the short, popular ones, belong to multiple categories of information and have multiple interpretations.

Current engines do not consider multiple possible intents of a query when presenting the search results. Consider again the query flash. In a recent sampling conducted by the inventors hereof, the first result page for this query on live contained eight documents related to Adobe Flash, one related to camera flash, and one related to the band, Grandmaster Flash. Similarly on Google, the first result page contained seven documents related to Adobe Flash, one related to the Stanford Flash project, one related to home security system, and one related to an online music store. Clearly, the first user described above would be satisfied with these search results, but the second and third would not.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

With the above thus in mind, an embodiment of the present invention is directed to a new paradigm for determining and presenting results of a search query that minimizes the risk of dissatisfaction with search results for any arbitrary user. The invention can easily be extended to the case of minimizing dissatisfaction of a respective particular user, taking into account interests of such a specific user. One specific embodiment of this invention includes the existence of a taxonomy of information. A user query can belong to one or more categories of this taxonomy. Similarly, a document can belong to one or more categories.

Thus, instead of presenting results in the order of one authority score computed by the ranking algorithm, an embodiment of the present invention determines the categories to which a query belongs, then ranks the categories, and finally presents relevant results in each category. Specifically, the invention includes a method that computes the number of categories to present for a given query; computes the number of results to show in each category; computes an ordering of categories; and for all the result pages beyond the first page uses user interface elements that optionally allow the user to quickly zoom in on a specific category and get more results belonging to that category. Alternatively, an embodiment of the present invention takes into account a user profile to order the categories.

More specifically now according to certain embodiments of the present invention, there is provided a method for listing documents found in a search given an input query. One specific embodiment of this method includes the steps of providing a taxonomy for categorizing documents and queries, providing an authority score for each document to be retrieved, receiving a search query from a user, assigning a probability that the search query is in at least a first category of the taxonomy, assigning a probability that the search query is in at least a second category of the taxonomy, retrieving at least one document from the first category, retrieving at least one document from the second category, and returning a search result for the search query by listing documents from the at least first and second categories in an order that takes into account the probabilities for each category and the authority score for each of the retrieved documents. This method may include the further the step of calculating a specified number of categories to present for a respective search query where the specified number of categories is two or greater. The method may also advantageously further include the step of calculating a specified number of documents to present within each of the specified number of categories. And in a particular embodiment thereof, the method may include the step of calculating an ordering of each of the specified number of categories. Generally, in performing this method, each of the specified number of categories is assigned a probability that the search query is in that particular category of the taxonomy. The sum of all the probabilities of each of the specified number of categories is equal to one for purposes of practicing this aspect of the present method. The method may also include the further step of retrieving at least one document from each of the specified number of categories. In practicing this embodiment of the method when a first document listed in a first ordered category has an authority score of 1.0, the next listed document is from the second ordered category. Here according to another particular aspect, the listed document from the second ordered category has the highest authority score of all documents retrieved in the second ordered category.

In accordance with another aspect of this invention, there is provided a networked computer system for use in listing documents found in a search given an input query. The system may advantageously include stored documents capable of being searched and retrieved electronically; memory for storing a search engine including a ranker and executable methods of searching for desired types of the stored documents; an input device for inputting a search query directed to retrieving a respective collection of the desired types of the stored documents; a processor operatively linked to the input device for processing the search query; and a browser operatively associated with the processor for cooperatively engaging the front end of the search engine so that when the search engine receives the search query from a user, the search engine retrieves a set of the stored documents relevant to the search query, each document within the set having an authority score and belonging to a category within a taxonomy and the ranker lists each document within the set in an order that takes into account the probability for each category being relevant to the search query and the authority score for each of the retrieved documents. In this system, the ranker calculates a specified number of documents to present within each of the categories, and may also calculate a specified number of categories to present to the user in response to processing the search query.

According to another aspect of certain embodiments of the present invention there is further provided a specific method of listing documents found in a search given an input query. This embodiment includes the steps of representing a probability of a respective query q in category c by $P(c|q)$; representing by $Q(d|q, c)$ a quality value of a document d for the query q belonging to the category c in the range [0,1] for each of the documents d; representing a utility vector by $U(c|q)$ and setting its initial value to the $P(c|q)$ wherein when a respective document is selected for display within the category c, the value of $U(c|q)$ will decrease depending on the values of $Q(d|q, c)$; and selecting k documents for displaying on a page where a set of k documents, S, out of a document set D is derived such that $$\max_{S \subseteq D} \sum_{c} P(c) \left( 1 - \prod_{d \in S} (1 - Q(d|c)) \right).$$

Here the results produced by executing the respective query on a ranking algorithm are denote by R(q), and the ranking algorithm may advantageously be classical. Also here for an input q, C(q), R(q), $\forall d \in R(q)$, C(d) the following steps may be further performed: (1) $S = \{\}$. $U(c) = P(c)$ for all $c \in C(q)$; (2) choose an order of categories to be displayed based on U(c) and reorder C(q); and (3) for each category $c \in C(q)$ do; (a) for each document $d \in R(q)$, compute $g(d, c) = U(c)Q(d|c)$; (b) add the document d* with the largest g(d, c) to S with ties broken arbitrarily; (c) for each category $c \in C(d^*)$, update $U(c) = (1 - Q(d^*|c)) U(c)$; and (d) set $R(q) = R(q) \setminus d^*$. And further this method may include, while |S|<k, the following steps (i) for each document $d \in R(q)$ compute $g(d, c) = U(c)Q(d|c)$, for all $c \in C(q)$; (ii) add the document d* with the largest g(d, c) to S with ties broken arbitrarily; (iii) for each category $c \in C(d^*)$, update $U(c) = (1 - Q(d^*|c)) U(c)$; and (iv) set $R(q) = R(q) \setminus d^*$. Here the steps may be repeated for succeeding pages, and the distribution U(c) may carry over from the end of execution of a previous page and is not re-initialized at the beginning of every page.

BRIEF DESCRIPTION OF THE DRAWING FIGURES

Further aspects and characteristics of the embodiments of the present invention together with additional features contributing thereto and advantages accruing therefrom will be apparent from the following description of certain embodiments of the invention which are shown in the accompanying drawing, wherein.

DETAILED DESCRIPTION

The subject matter of the embodiments of the present invention is described with specificity herein to meet statutory requirements. However, the description itself is not intended to limit the scope of the claims of any patents issuing hereon. Rather, the inventors have contemplated that the claimed subject matter might also be embodied in other ways, include different steps or combinations of steps similar to the ones described herein, or used in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
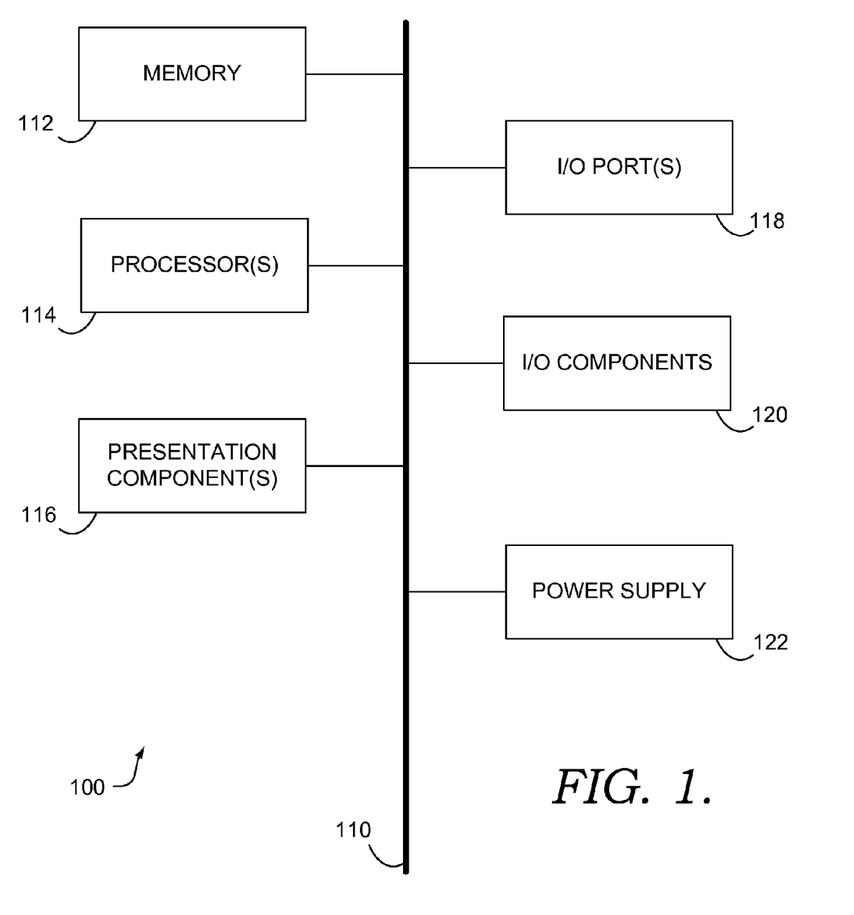
FIG. 1 is a block diagram representing typical elements in a computer operating environment in which embodiments of the present invention may be implemented.

Having briefly described above an overview of certain embodiments of the present invention, an exemplary operating environment for the various embodiments of this invention is next described. Referring now to FIG. 1, an exemplary operating environment for implementing embodiments of the present invention is shown and designated generally as computing system or device 100. Computing device 100 is just one example of a suitable computing environment and is not intended to suggest any limitation as to the scope of use or functionality of the invention. The inventors hereof envision that the inventions disclosed herein may be readily applied in a wide range of computing devices, systems, or environments whether networked or stand alone including for example, desktop PCs, hand-held computing devices, navigation systems, digital radios, home entertainment systems, and any other known or future computing environment where the display of the results of a query obtained by a search engine is desired. Thus the computing environment 100 should not be construed as having any particular dependency or requirement relating to any one or combination of the components or modules illustrated. Certain aspects and embodiments of the present inventions may be described in the general context of computer code or machine-useable instructions, including computer-executable instructions such as program components, being executed by a computer or other machine, such as a personal data assistant or other handheld device as discussed above. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, and so forth, whether known today or developed subsequently hereto. Embodiments of the invention may also be practiced in distributed computing environments where tasks are performed by remote-processing devices that are linked through a communications network.

With continued reference to FIG. 1, computing system 100 includes a bus 110 that directly or indirectly couples a memory 112, one or more processors 114, one or more presentation components 116, input/output (I/O) ports 118, I/O components 120, and an illustrative power supply 122. Bus 110 represents what may be one or more buses such as those that may include an address bus, a data bus, or a combination thereof. Although the various blocks of FIG. 1 are shown with solid line connections which may represent a hard wire connection, any one or more of the elements may be wirelessly connected where desired, appropriate, or technically feasible. In addition thereto, certain hardware/software implementations hereof may include a wide variety of various components and functionalities so the elements illustrated in FIG. 1 are to be taken only as exemplary and not limiting in any intended or particular manner. For example, one may consider a presentation component such as a display to be both an input and output component since some current displays with touch features allows a user to manipulate on screen displayed items. Also, processors have memory as those skilled in the art would readily appreciate. The inventors hereof recognize that such is the nature of the art, and reiterate that the diagram of FIG. 1 is merely illustrative of an exemplary computing device or system that can be used in connection with one or more embodiments of the present invention. Distinction is not made between such categories as "workstation," "server," "laptop," "hand-held device," or the like, as all are contemplated within the scope of FIG. 1 and reference to as "computer", "computing device", or "computing system."

Now more specifically, the computer 110 typically includes a variety of computer-readable media. Computer-readable media includes any available media that can be accessed by computer 110 and encompasses both volatile and nonvolatile media, as well as removable and non-removable media. By way of example, and not limitation, computer-readable media may include computer storage media and communication media. Computer storage media includes such volatile and nonvolatile, removable and non-removable media implemented in any method or technology for storage of information such as computer-readable instructions, data structures, program modules or other data. More specifically, computer storage media includes, but is not limited to, RAM, ROM, EEPROM, flash memory or other memory technology, CD-ROM, digital versatile discs (DVD) or other optical disc storage such as Blu-ray or HD-DVD, magnetic cassettes, magnetic tape, magnetic disk storage or other magnetic storage devices, or any other medium which may be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope and meaning of computer-readable media.

Memory 112 includes computer-storage media in the form of volatile and/or nonvolatile memory. The memory 112 may be removable, non-removable, or a combination thereof. Exemplary hardware devices include solid-state memory, hard drives, optical-disc drives, and other such current or future devices that would provide the desired functionality. Computing device 100 includes one or more processors 114 that read data from various entities such as memory 112 or I/O components 120. Presentation component(s) 116 present data and/or sensory indications to a user or other device. Exemplary presentation components include a video display, speaker, printing component, vibrating component, and any such current or future presentation components. I/O ports 118 allow computing device 100 to be logically coupled to other devices, including I/O components 120, some of which may be built in. Illustrative components include a microphone, joystick, game pad, satellite dish, scanner, printer, wireless device, and others as desired, appropriate, or technically feasible.

Figure 2:
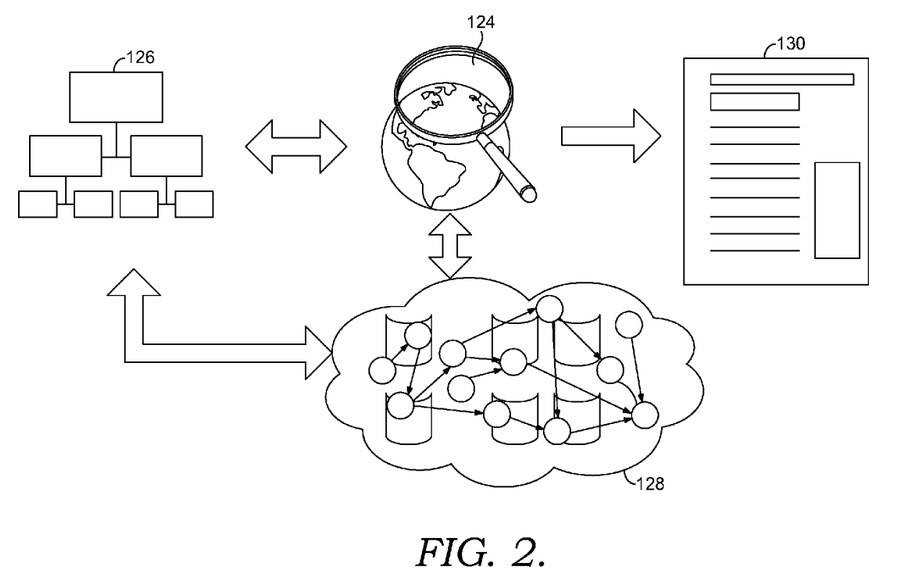
FIG. 2 is a pictorial representation of a computer system network including a search engine and electronically stored and searchable documents.

With reference next to FIG. 2, there is shown a pictorial representation of a computer system network including a search engine and electronically stored and searchable documents. FIG. 2 shows a graphical representation of a search engine 124, a taxonomy 126, a representation of the Internet 128, and a graphical representation of search results 130. As would be apparent to those of skill in the art, there are various search engines available and such search engines are readily accessed via a computer device as enabled with Internet access. The typical search engine is a bundle of software components residing typically in a distributive computing system including a number of linked servers. The search engine may include a ranker or dynamic ranker component or module. As would be appreciated by those of skill in the art given the present disclosure, the methods hereof when embodied in software as executable code would reside with and interact with such a dynamic ranker. Further, the typical search engine has a front end which interacts with an Internet browser, for example, which browser would typically reside on the hard drive of a personal computer or hand-held computing device. Thus when a user of a personal computer types a search query, the processor of his personal computing devices interacts with the local browser, which in turn interacts with the front end of the search engine, which then engages the ranker to execute the required search over the various documents stored and available generally from the Internet.

As further understood by those of skill in the art, the taxonomy 126 provides a hierarchy and categorization for documentation which is electronically stored and retrievable from various websites and servers within a computer network such as the Internet. Search results 130 based on a search query are typically tabulated, listed, or otherwise presented in some fashion by search engines and their associated hardware and software including a dynamic ranker, on a video display monitor accessible by the user and part of the user's personal computing device.

Figure 3:
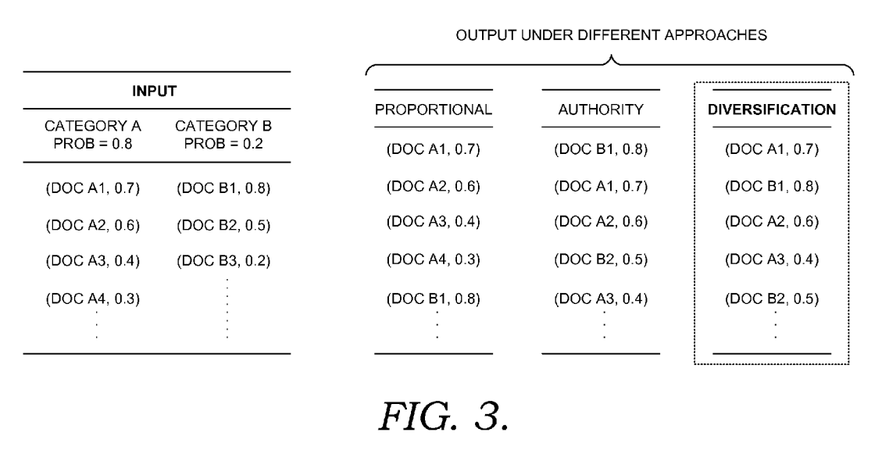
FIG. 3 is a graphical representation illustrating categories and retrieved documents with authority scores and a listing of the results under prior art methods as compared to one method embodiment of the present invention.

Next with reference to FIG. 3, there is presented a graphical representation of categories and retrieved documents with authority scores and a listing of the results under prior art methods as compared to one embodiment of the present invention. On the input side the documents have been categorized under two categories as shown. These include Category A and Category B. As indicated, Category A has a probability of 0.8 that the search query is within the Category A of the taxonomy and Category B has a probability of 0.2 that the search query is within Category B. As further indicated, Category A includes documents A1 with a priority score of 0.7, A2 with a priority score of 0.6, A3 with a priority score of 0.4, and document A4 with a priority score of 0.3. Similarly, Category B includes documents B1 with a priority score of 0.8, document B2 with a priority score of 0.5, and document B3 with a priority score of 0.2.

The output portion of FIG. 3 illustrates the listing of the retrieved documents on the input side under three different methodologies. Under the Proportional methodology know in the prior art, first document A1 is listed with an authority score of 0.7, next listed is A2 with an authority score of 0.6, then listed is A3 with an authority score of 0.4, next is document A4 with an authority score of 0.3, and lastly here under the Proportional methodology is document B1 with an authority score of 0.8.

Under the Authority method of the prior art methodologies, document B1 with the highest authority score of 0.8 listed first, document A1 with the next highest authority score of 0.7 is next listed, document A2 with the next highest authority score of 0.6 is then listed third, document B2 with the next highest authority score of 0.5 is then listed, and lastly listed is document A3 with an authority score of 0.4.

According to the methodologies of the current invention, referred to briefly herein for convenience as "Diversification", the documents on the input side as show in FIG. 3 would be listed as illustrated which includes a first listing of document A1 having an authority score of 0.7, then listed second is document B1 with an authority score of 0.8, third listed is document A2 with an authority score of 0.6, next listed is then document A3 with an authority score of 0.4, and then lastly listed is document B2 with an authority score of 0.5. It will be readily appreciated by those with the skill in the art that listing the documents in accordance with the present methodologies departs from the traditional methods such as Proportional and Authority. Here, according to the present methodology document A1 is listed first since the probability of Category A being relevant to the search is 0.8. Under the present methodology, if a user is not interested in the Category A1 document with the authority score of 0.7, the next listed is document B1 with an authority score of 0.8. This gives better efficiency and user satisfaction since it is believed that a user bypassing document A1 would next be then interested in documents from Category B with higher authority scores notwithstanding the lower probability of 0.2 that the search query is within Category B. Thus in this manner if a users is actually looking for documents from Category A given the 0.8 probability associated therewith, the highest authority score document in Category A is listed first. However, if in fact the user is not interested in Category A documents then the user will find the highest ranked document from B1 next listed. Thus, according to the teachings hereof, in the case of a user desiring documents from B1 the user reaches the first document with the highest priority score without having to look through other documents from A1. Therefore, it should be understood that the present method of Diversification is based on importance as measured by authority score scaled by probability.

Figure 4:
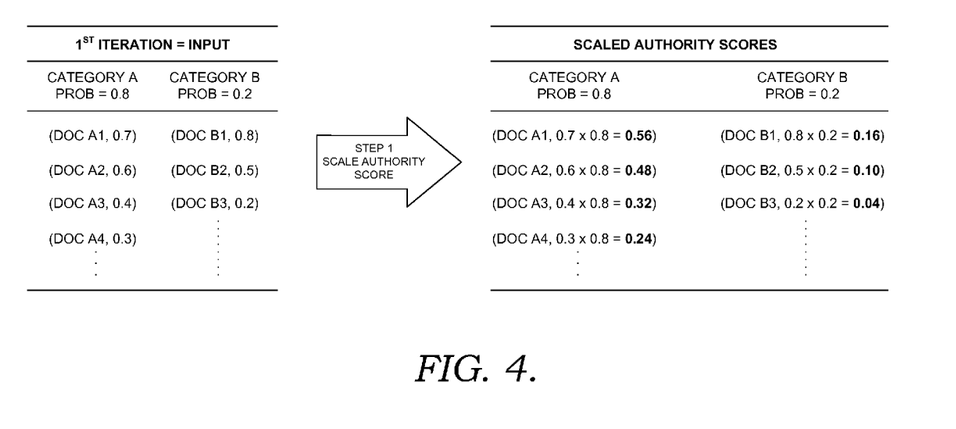
FIG. 4 is a graphical representation of an initial step in a method hereof showing how the retrieved documents with authority scores of FIG. 3 are scaled according to one aspect of the present invention.

Now with reference to FIG. 4, there is shown a graphical representation of an initial step in one embodiment of a method hereof showing how the retrieved documents with authority scores of FIG. 3 are scaled according to one aspect of the present invention. FIG. 4 shows the initial input under a 1st Iteration in that Category A has a probability again here as 0.8 with Category B having a probability of 0.2. The documents under Category A and Category B show the initial priority scores as presented above in FIG. 3. Under a first step, the authority scores are scaled according to the relative probabilities in categories Category A and B. Here it should be understood by those skilled in the art that in the case of three categories, the same methodology would apply with the probabilities of the three categories adding to a total probability of 1.0. Thus as shown under the Scaled Authority Scores in FIG. 4, in Category A with a probability of 0.8, document A1 will have a scaled score of 0.56 which is derived by taking its original priority score of 0.7 and as illustrated, multiplying it by 0.8 the probability associated with Category A. Next document A2 has a scaled authority score of 0.48 derived again by taking the original authority score of 0.6 and multiplying by the probability 0.8. Thus in this manner the scaled authority score for document A3 is 0.32 and the scaled authority score for document A4 is 0.24. Similarly now with Category B documents illustrated in FIG. 4 the original authority score of document B1 is multiplied by 0.2, the probability that the search query is in within Category B, which results in a new scaled authority score for document B1 of 0.16. Similarly, document B2 has the new scaled authority score of 0.10, and document B3 has a new scaled authority score of 0.04.

Figure 5:
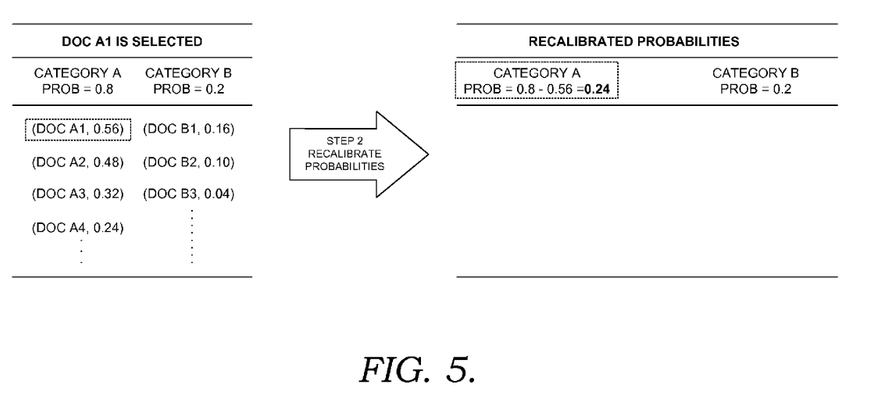
FIG. 5 is a graphical representation of a recalibration step utilized in the method initiated in FIG. 4.

FIG. 5 is a graphical representation of a recalibration step utilized in the method initiated in FIG. 4. Now as shown in FIG. 5, document A1 is selected and the next step according to the present methodology is to recalibrate the probability of Category A. Thus, here according to an embodiment of the present invention, the initial probability of Category A which started at 0.8 is here reduced by the new authority score of document A1 such that the recalibrated probability of Category A becomes, as illustrated, 0.24. Here at this step as further illustrated in FIG. 5 the Category B probability remains at 0.2.

Figure 6:
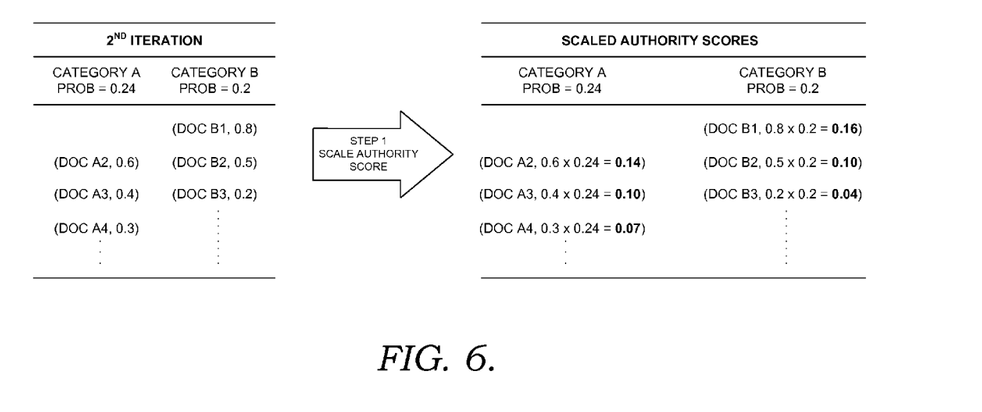
FIG. 6 illustrates a scaled authority scoring step in a second iteration of the method continued from FIG. 5.

FIG. 6 next illustrates a scaled authority scoring step in a second iteration of the method continued from FIG. 5. Now here as shown under the 2nd Iteration, the Category A probability stands at 0.24, and document A1 has been selected for listing first as shown in the Results Output of FIG. 8. Thus the first document now remaining under Category A is document A2 with an original authority score of 0.6. Here as indicated the next step is to scale the authority score of each of the remaining documents in categories A and B. Thus with the new probability of 0.24 in Category A, the original authority score of 0.6 of document A2 is multiplied by the new scaled probability of 0.24 to result in a new priority score of 0.14. Similarly the original authority score of document A3 which was 0.4 is multiplied by the new 0.24 probability of Category A to result in a new 0.10 authority score for document A3. Finally, document A4's new authority score is 0.07 which is similarly derived by taking its original authority score of 0.3 and multiplying that by the revised probability of Category A as illustrated. Now similarly in continuing with reference to FIG. 6, the new scaled authority scores for document B1 is derived by multiplying its original authority score of 0.8 by the current probability of 0.2 to result in a new scaled authority score of 0.16. In this manner the new scaled authority score for document B2 is 0.10 as illustrated and the new authority score for document B3 is 0.04.

Figure 7:
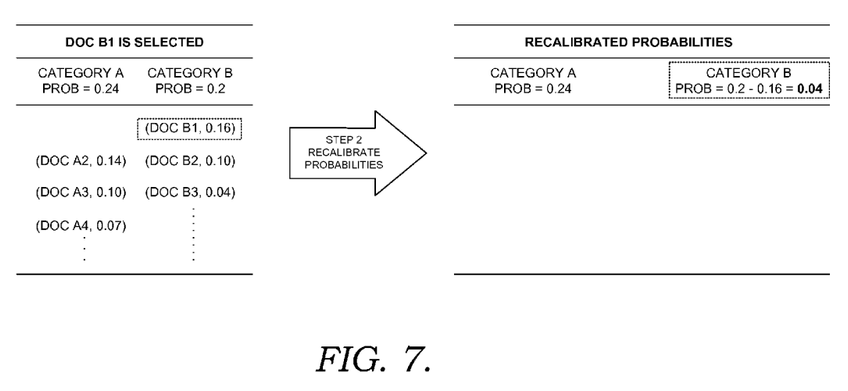
FIG. 7 is a graphical representation of a recalibration of a probabilities step utilized in the method continued from FIG. 6.

Next shown in FIG. 7 is a graphical representation of a recalibration of probabilities step utilized in the method continued from FIG. 6. As shown here in FIG. 7, document B1 with a revised authority score of 0.16 is selected next for listing in the output search result shown in FIG. 8 under the Results Output. Now here the probability of Category B is recalibrated by taking the original probability of Category B which was 0.2 and reducing that by the new priority score of document B1 which is 0.16 to arrive at a new recalibrated probability for Category B which is 0.04, as illustrated. Thus, as finally illustrated in FIG. 7 at this point in this method embodiment of the present invention, Category A has a revised probability of 0.24 and Category B now has a recalibrated probability of 0.04.

Figure 8:
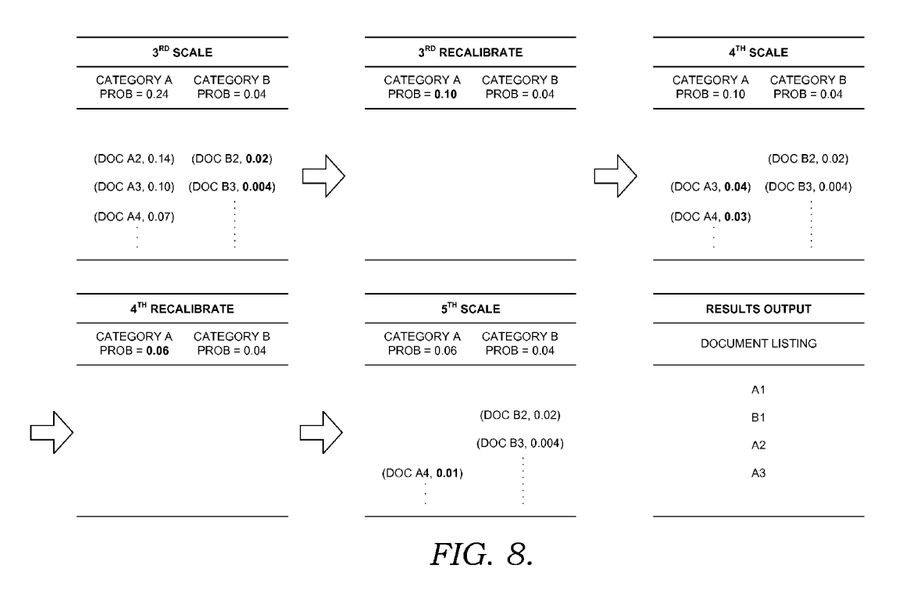
FIG. 8 is a graphical representation of the reiterative scaling and recalibrating steps of this method illustrating final results thereof.

FIG. 8 is a graphical representation of the reiterative scaling and recalibrating steps of this method illustrating final results thereof under the Results Output. As illustrated here in FIG. 8, the methodology proceeds with a 3rd scaling. Here at this stage in the process, documents A1 and B1 have been consecutively listed, Category A has the revised probability of 0.24, and Category B has the revised probability of 0.04. Applying the recalibration methodology here at the 3rd stage, Category A then results in a new probability of 0.10. And as continued under the 4th scaling iteration document A3 now has an authority score of 0.04 and document A4 has a new authority score of 0.03. Thus document A3 is selected and next list in the Results Output.

Next at the $4^{th}$ recalibration, the probability of Category A is reduced to 0.06 and to complete the method the priority score of document A4 is reduced to 0.01. Since here it is desired to list only 4 documents in the Results Output, the method illustrated here discontinues at the $5^{th}$ scaling for completeness.

As indicated above for purposes of the present disclosure, the existence of a taxonomy of information is assumed and the queries and documents relevant thereto are categorized according to this taxonomy using well-known techniques. Next for purposes of illustration and discussion, we denote the set of categories to be C, and assume that each query belongs to certain categories according to a certain distribution which is known. For example, take the query flash.

TABLE 1

Categorization of the Keyword flash

| Category | Probability |
| --- | --- |
| Technology | 0.55 |
| Fictional Characters | 0.20 |
| Popular Culture | 0.13 |
| People | 0.12 |
| Locations | 0.05 |

Next we denote the probability of a query q in category c by P(c|q). Thus, P(flash|Technology) is equal to 0.55 in the above example.

A simple prior art scheme for determining the number of documents to show from a category on a page is proportional allocation. This scheme, however, is not satisfactory. Coming back to the Flash example, this scheme might suggest that we should show six documents related to the technology interpretation of the query, which would cause six documents related to Adobe Flash to be displayed on Live (or Google). On the other hand, having selected the Adobe Flash player as the first result to show, the utility of showing additional documents in this category is suspect.

For each document d, represent by Q(d|q, c) the quality (value) of a document d for query q belonging to category c in the range [0,1]. The quality of a document for a query belonging to a certain category is assumed to be independent of the quality of other documents. Quality is used as a proxy for various measures such as the likelihood of the document satisfying the user intent in issuing the query. Q is given a probability interpretation and it is assumed that $$\sum_c Q(d \mid q, c) = 1.$$

In the allocation scheme according to the various embodiments hereof, a notion of the utility of a category in satisfying a user query q is employed. This utility vector is represented by U(c|q) and its initial value will be set to P(c|q). As a document is selected for display within category c, the value of U(c|q) will decrease depending on the values of Q(d|q, c).

Now consider an example where only two categories $c_1$ and $c_2$ for a given query q exist. Assume that the search engine corpus contains 10 documents each from the two categories. Furthermore, let the quality of documents in $c_1$, Q(d|q, $c_1$), be described by the distribution 0.6, 0.20, 0.10, 0.05, 0.025, 0.0125, 0.00625, 0.003125, 0.0015625, while the quality of documents in $c_2$, Q(d|q, $c_2$), is uniform, i.e., 0.1 for each of the 10 documents. Under these distributions, the utility of $c_1$ decreases more than the utility of $c_2$ from the user's perspective as documents each belonging to the respective categories are added to the result set. Having added a high quality document to $c_1$, the marginal utility of adding a document of lower quality in $c_1$ is low. On the other hand, since documents belonging to category $c_2$ are of the same quality and therefore have equal chance of satisfying the user query, the marginal utility of adding another document to $c_2$ does not decrease.

Result diversification according to the teaching hereof is next present in a formal manner. Here it is assumed that the search engine shows at most k results on a page (k is usually 10).

For purposes of clarity and convenience henceforth herein, each query will be considered independently the reference to q will be dropped. Instead, P(c), Q(d|c), and U(c) will be employed with the knowledge that these quantities are defined with respect to a given query.

The problem if selecting k documents for displaying on a page is as follows:
Diversify(k)
Find: a set of k documents, S, out of the document set D, such that $$\max_{S(D)} \sum_c P(c)\left(1 - \prod_{d \in S}(1 - Q(d \mid c))\right).$$

Denote by R(q) results produced by executing the query on the classical ranking algorithm. The documents from R(q) will be selected and displayed using the present methodology.
Greedy Algorithm:

---

Input: q, C(q), R(q), ∀d ∈ R(q), C(d)
 1. S = { }. U(c) = P(c) for all c ∈ C(q).
 2. Choose the order of categories to be displayed based on U(c) and reorder C(q)

-continued

```
3. for each category c ∈ C(q) do
    a. for each document d ∈ R(q), compute g(d, c) = U(c)Q(d | c)
    b. add the document d* with the largest g(d, c) to S with ties
       broken arbitrarily
    c. for each category c ∈ C(d*), update U(c) = (1 − Q(d* | c))
       U(c)
    d. R(q) = R(q)\d*
4. while |S| < k do:
    a. for each document d ∈ R(q) compute g(d, c) = U(c)Q(d | c),
       for all c ∈ C(d)
    b. add the document d* with the largest g(d, c) to S with ties
       broken arbitrarily
    c. for each category c ∈ C(d*), update U(c) = (1 − Q(d* | c))
       U(c)
    d. R(q) = R(q)\d*
```

The above algorithm is repeated for succeeding pages. It should be understood that the distribution $U(c)$ carries over from the end of execution of the previous page and it is not re-initialized at the beginning of every page.

In the special case where each document belongs to a single category, i.e., $Q(d|c)=v>0$ for exactly one category, the algorithm described can be further simplified. Thus in this embodiment hereof, the method may be started by grouping the documents according to their category, and sorting these documents in decreasing order of $Q(d|c)$. In step 3a, it is necessary only to compute $g(d, c)$ for the documents in the head of the respective queues. In step 3c, it is only needed to update the $U(c)$ for the category out of which a document is chosen in step 3b.

In further view of the detailed description discussed above, next provided are illustrative examples of some of the described methods which employ the variables so indicated therein. For purposes of further clarity each of the inventive examples is followed by a brief comparison to a typical naive allocation methodology as would be applied to the given parameters of the subject example.

Example 1

For the search query, let C1 represent the first category in the taxonomy, and C2 represent the second category in the taxonomy. Let P1 represent the likelihood that the user query belongs to C1, and for this example let P1 equal 0.9. Further let P2 represent the likelihood that the user query belongs to C2, and let P2 in this example equal to 0.1. Now according to the taxonomy, let the search query identify three documents in C1 which include D1 with an authority score of 1.0, D2 with an authority score of 0.4, and D3 also with an authority score of 0.4. Now further let the search query identify three documents in C2 which include D1 with an authority score of 0.5, D2 also with an authority score of 0.5, and a D3 with an authority score of 0.3. Now according to the methods hereof in the case where 3 documents are returned, the search result for the query given the above will first return C1D1 with authority score 1.0, then return C2D1 with authority score 0.5, and lastly return C2D2 also with an authority score of 0.5. Thus here, if the query does not belong to C1 given that C1D1 has an authority score 1.0, it is thus 100 percent certain that the user would next be interested in documents from C2. Now similarly, in the case where 4 documents are returned by this method under this Example 1, the results for the first, second, and third returns will be as above with C1D1, C2D1, and C2D2, consecutively listed, then in fourth position C2D3 with an authority score of 0.3 since we know with certainty that the user is not interested in C1.

In contrast to the above, the simple methods of the prior art (using, say, proportional allocation), given the above example parameters, would list C1D1, C1D2, and C1D3 in that order when limited to three returns; thus preventing any C2 returns. And when returning four returns, the prior art would list C1D1, C1D2, C1D3, and then C2D1 thereby forcing the user to look at C1D2 and C1D3 with authority scores of 0.4 and 0.4 respectively before listing C2D1 with a higher relative authority score of 0.5; thereby illustrating the absence of recognizing that if the user was not interested in C1D1 with an authority score of 1.0, such a user's query most likely does not fall with C1 and thus the next listed document should be from C2 which is more likely to satisfy the user's information need.

Example 2

Next for the search query of this Example 2, let C1 similarly represent the first category in the taxonomy, and C2 represent the second category in the taxonomy. Let P1 again represent the likelihood that the user query belongs to C1, but now for this example let P1 equal 0.6. Further let P2 again represent the likelihood that the user query belongs to C2, with P2 here in this example equal to 0.4. Now again according to the taxonomy, let the search query identify three documents in C1 which include D1 with the authority score of 1.0, D2 with the authority score of 0.4, and again a D3 also with an authority score of 0.4. Now again let the search query identify three documents in C2 which here again include a D1 with an authority score of 0.5, a D2 also with the authority score of 0.5, and a D3 with the authority score of 0.3. Now according to the methods hereof in the case where 3 documents are returned, the search result for the query given the above will again first return C1D1 with authority score 1.0, then return C2D1 with authority score 0.5, and lastly return C2D2 also with an authority score of 0.5. Thus here again, if the query does not belong to C1 given that C1D1 has an authority score 1.0, it is thus certain that the user would next be interested in documents from C2. Now similarly, in the case where 4 documents are returned by this method under this Example 2, the results for all the positions will be as above with C1D1, C2D1, C2D2, and C2D3 consecutively listed.

In contrast to the above, the naive allocation using proportional allocation methods of the prior art, given the above parameters in this Example 2 with P1 just greater than P2, would list C1D1, C1D2, and C2D1 in that order when limited to three returns; thereby still listing a second document from C1 before the first listed document from C2 even though it would be certain that a user bypassing C1D1 with the 1.0 authority score would next be interested in C2. And then when returning four returns, the prior art here would list C1D1, C1D2, C2D1, and then C2D2 thereby again illustrating the absence of recognizing that if the user was not interested in C1D1 with the absolute authority score of 1.0, such a user's query most highly likely does not fall within C1 and thus the next listed document should be from C2 to optimize user satisfaction.

Example 3

Now for the search query in this next Example 3, let again C1 similarly represent the first category in the taxonomy, and C2 represent the second category in the taxonomy. Let P1 again represent the likelihood that the user query belongs to C1, and again for this example let P1 equal 0.6. Further let P2 also represent the likelihood that the user query belongs to C2, with P2 here again in this example equal to 0.4. Now again according to the taxonomy, let the search query identify three documents in C1 which include D1 with a different authority score of 0.6, a D2 with an authority score of 0.4, and again a D3 also with an authority score of 0.4. Now again let the search query identify three documents in C2 which here again include a D1 but now with an authority score of 0.7, a D2 also with the authority score of 0.5, and a D3 with the authority score of 0.3 as in Examples 1 and 2 above. Now according to the methods hereof in the case where 3 documents are returned, the search result for the query given the above parameters will again first return C1D1 with authority score 0.6, then return C2D1 with authority score 0.7, and lastly return C1D2 with an authority score of 0.4. Thus here again, if the user has bypassed document C1D1, it is not fully certain that the user is not interested in C1 since the document has an authority score of 0.6 only. However, the attractiveness of other documents in C1 decreases with respect to other documents in C2 since the authority score of the bypassed document is rather high. Therefore, C2D1 is listed in the next position. Now according to the present method, D2 from C1 is next listed because if the user bypasses the second listing it is most likely the user may be interested in C1 even though the user may have skipped by the first listing of C1D1 which is not absolutely authoritative (as with the 1.0 scored document in Examples 1 and 2). Now in the case where 4 documents are returned by this method under the parameters of this Example 3, the results for the first, second, and third returns will be as above with C1D1, C2D1, and C1D2, consecutively listed, then next here in fourth position list C2D2 with the authority score of 0.5.

In contrast to the above, the naive allocation methods of the prior art, given the above parameters in this Example 3 with P1 again just greater than P2 as in Example 2 above, would list C1D1, C1D2, and C2D1 in that order when limited to three returns; thereby still listing a second document from C1 before the first list document from C2 even though it would be somewhat certain that a user bypassing C1D1 with the 0.6 authority score would next be interested in C2. And then when returning four returns, the prior art here would list C1D1, C1D2, C2D1, and then C2D2 thereby again illustrating the absence of recognizing that if the user was not interested in C2D1 given the indicated authority scores, such a user more likely would be interest next in a C1 document.

While this invention has been described in detail with reference to certain embodiments and examples, it should be appreciated that the present invention is not limited to those precise embodiments or in any way to the examples given by way of illustrative purposes. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. A computer-implemented method for listing documents found in a search given an input query, said method comprising the steps of:
   providing a taxonomy for categorizing documents and queries;
   receiving a search query from a user;
   assigning an initial numerical category utility of a first category to initially be equal to a numerical probability that said search query is in a first category of said taxonomy;
   assigning an initial numerical category utility of a second category to initially be equal to a numerical probability that said search query is in a second category of said taxonomy;
   assigning a first authority score to a first document from said first category, wherein said authority score quantifies document content relevance of the first document to said search query;
   assigning a second authority score to a second document from said second category, wherein said authority score quantifies document content relevance of the second document to said search query;
   computing a first numerical scaled authority score of said first document from said initial numerical category utility of said first category and from said first authority score;
   computing a second numerical scaled authority score of said second document from said initial numerical category utility of said second category and from said second authority score;
   ranking at least two subsets of a set of documents into an order based on said first and second numerical scaled authority scores, wherein said set of documents includes said first document and said second document;
   selecting said first document as having a preferred position within said order based on said ranking; returning a search result for said search query by providing a list of documents including a first listing corresponding to said first document and a second listing corresponding to said second document, wherein said first listing is provided in said list of documents before said second listing based on said selecting;
   determining a remainder set of documents from said set of documents by eliminating said first document from said set of documents; and
   determining a recalibrated numerical category utility of said first category based on said selecting of said first document, thereby enhancing category diversification of document selection;
   determining scaled authority-scores for each document in said set of documents; and
   listing first the document within said set of documents having the highest scaled authority-score;
   wherein the scaled authority-score for a document equals the product of the document's authority score and the utility assigned to the category of the document;
   wherein the recalibrated numerical category utility equals that category's utility minus the scaled authority-score of the selected document; and
   wherein the recalibrated numerical category utility of said first category serves as that category's assigned utility for computing scaled authority scores of documents in the remainder set.

2. The method according to claim 1, wherein said first numerical scaled authority score is the product of the initial numerical category utility of said first category and said first authority score, and wherein said second numerical scaled authority score is the product of the initial numerical category utility of said second category and said second authority score.

3. The method according to claim 1, further including the step of accepting a specified number of categories for a respective search query; and
   assigning an initial utility, for each category in the specified number of categories, wherein said initial utility relates to the numerical probability that the search query is in that particular category of the taxonomy.

4. The method according to claim 3, further including the step of accepting a specified number of documents within each category of said specified number of categories to form said set of documents.

5. The method according to claim 4, further including the step of accepting a number of documents to present on a page.

6. The method according to claim 5, including the further step of providing at least one document listing corresponding to at least one document from each of said category within said specified number of categories.

7. The method of claim 1, further comprising:
determining scaled authority-scores for documents in the remainder set;
listing next the document from the remainder set having the highest scaled authority-score, wherein the scaled authority-score for a document equals the product of the document's authority score and the utility assigned to the category of the document; and eliminating the just-listed document from the remainder set.

8. One or more computer storage media storing computer-usable instructions that, when executed by a processor, facilitate a method for listing documents found in a search given an input query, said method comprising the steps of:
providing a taxonomy for categorizing documents and queries;
receiving a search query from a user;
assigning an initial numerical category utility of a first category to initially be equal to a numerical probability that said search query is in a first category of said taxonomy;
assigning an initial numerical category utility of a second category to initially be equal to a numerical probability that said search query is in a second category of said taxonomy;
assigning a first authority score to a first document from said first category, wherein said authority score quantifies document content relevance of the second document to said search query;
assigning a second authority score to a second document from said second category, wherein said authority score quantifies document content relevance of the second document to said search query;
computing a first numerical scaled authority score of said first document from said initial numerical category utility of said first category and from said first authority score;
computing a second numerical scaled authority score of said second document from said initial numerical category utility of said second category and from said second authority score;
ranking at least two subsets of a set of documents into an order based on said first and second numerical scaled authority scores, wherein said set of documents includes said first document and said second document;
selecting said first document as having a preferred position within said order based on said ranking;
returning a search result for said search query by providing a list of documents including a first listing corresponding to said first document and a second listing corresponding to said second document, wherein said first listing is provided in said list of documents before said second listing based on said selecting;
determining a remainder set of documents from said set of documents by eliminating said first document from said set of documents; and
determining a recalibrated numerical category utility of said first category based on said selecting of said first document, thereby enhancing category diversification of document selection;
determining scaled authority-scores for each document in said set of documents; and
listing first the document within said set of documents having the highest scaled authority-score;
wherein the scaled authority-score for a document equals the product of the document's authority score and the utility assigned to the category of the document;
wherein the recalibrated numerical category utility of said first category equals that category's utility minus the scaled authority-score of the selected document; and
wherein the recalibrated numerical category utility of said first category serves as that category's assigned utility for computing scaled authority scores of documents in the remainder set.

9. The media of claim 8, further comprising accepting a specified number of categories for a respective search query; and
assigning an initial utility, for each category in the specified number of categories, wherein said initial utility relates to a numerical probability that the search query is in that particular category of the taxonomy.

10. The media of claim 8, wherein said first numerical scaled authority score is the product of the initial numerical category utility of said first category and said first authority score, and wherein said second numerical scaled authority score is the product of the initial numerical category utility of said second category and said second authority score.

11. The media of claim 8, further comprising:
determining scaled authority-scores for documents in the remainder set listing next the document from the remainder set having the highest scaled authority-score, wherein the scaled authority-score for a document equals the product of the document's authority score and the utility assigned to the category of the document; and
eliminating the just-listed document from the remainder set.

12. The media of claim 8, wherein said returning a search result for said search query provides a list for display on a hand-held computing device.

* * * * *